US010526077B2

United States Patent
Wulff et al.

(10) Patent No.: US 10,526,077 B2
(45) Date of Patent: Jan. 7, 2020

(54) MULTI-OBJECTIVE CONTROL SYSTEM WITH CONTROL ALLOCATION

(71) Applicant: Sikorsky Aircraft Corporation, Stratford, CT (US)

(72) Inventors: Ole Wulff, Ansonia, CT (US); Derek Geiger, Wilton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 343 days.

(21) Appl. No.: 15/441,506

(22) Filed: Feb. 24, 2017

(65) Prior Publication Data

US 2017/0327209 A1  Nov. 16, 2017

Related U.S. Application Data

(60) Provisional application No. 62/334,761, filed on May 11, 2016.

(51) Int. Cl.
*B64C 27/00* (2006.01)
*B64C 27/80* (2006.01)
*B64C 27/10* (2006.01)

(52) U.S. Cl.
CPC ............ *B64C 27/008* (2013.01); *B64C 27/10* (2013.01); *B64C 27/80* (2013.01)

(58) Field of Classification Search
None
See application file for complete search history.

(56) References Cited

U.S. PATENT DOCUMENTS

| 4,825,375 | A | 4/1989 | Nadkarni et al. | |
| 6,592,071 | B2 | 7/2003 | Kinkead et al. | |
| 6,793,173 | B2 | 9/2004 | Salesse-Lavergne | |
| 9,085,352 | B2 * | 7/2015 | Eglin | B64C 13/16 |
| 9,242,723 | B2 | 1/2016 | Wildschek | |
| 2008/0237392 | A1 * | 10/2008 | Piasecki | B64C 27/26 244/6 |
| 2015/0028152 | A1 * | 1/2015 | Eller | B64C 27/001 244/17.13 |

(Continued)

FOREIGN PATENT DOCUMENTS

| WO | 2015152910 A1 | 10/2015 |
| WO | 2016137566 A1 | 9/2016 |

OTHER PUBLICATIONS

European Patent Office, The extended European search report dated Sep. 19, 2017; Application No. 17158968; pp. 1-11.

*Primary Examiner* — Lail A Kleinman
(74) *Attorney, Agent, or Firm* — Cantor Colburn LLP

(57) ABSTRACT

A flight system for an aircraft and method for controlling a clearance between a first rotor disk and a second rotor disk of an aircraft is disclosed. The flight system includes a sensor for measuring an angle of deviation of at least one of a first rotor disk and a second rotor disk of the aircraft to indicate a clearance between the first rotor disk and the second rotor disk as well as sensors for measuring a flight condition of the aircraft. A control allocation module uses the measured angle of deviation and the flight condition of the aircraft to determine an allocation of control settings to axis-controlling devices of the aircraft to attain a selected pitch of the aircraft, wherein the allocation is based at least on the measured angle of deviation and the flight state of the aircraft.

15 Claims, 3 Drawing Sheets

(56) References Cited

U.S. PATENT DOCUMENTS

2015/0198436 A1\* 7/2015 Cotton ................... G01B 11/14
                                                                                       701/14
2016/0229521 A1\* 8/2016 De Miranda Car .... B64C 13/06

\* cited by examiner

US 10,526,077 B2

MULTI-OBJECTIVE CONTROL SYSTEM WITH CONTROL ALLOCATION

CROSS REFERENCE TO RELATED APPLICATIONS

This invention claims priority from U.S. Provisional Application Ser. No. 62/334,761, filed May 11, 2016, the contents of which are incorporated herein by reference in their entirety.

STATEMENT OF FEDERAL SUPPORT

This invention was made with government support with the United States Army under Contract No.: W911W6-13-2-0013. The government therefore has certain rights in this invention.

BACKGROUND OF THE INVENTION

The present invention is directed to a system and method for flying a rotary wing aircraft having a dual rotor main rotor assembly and, in particular, to controlling a clearance between blade tips of the main rotor assembly.

Rotary wing aircraft such as helicopters generally include a main rotor assembly that sits atop a fuselage of the aircraft and a rear rotor assembly. In some models, the main rotor assembly includes two coaxial and counter-rotating rotor disks comprising an upper rotor disk of rotor blades and a lower rotor disk of rotor blades. Due to flight mechanics, the circumference of these rotor disks, i.e., the blade tips, can move up and down within an envelope. In order to ensure safe flight, it is necessary that the blade tips of the upper rotor disk do not make contact with the blade tips of the lower rotor disk. Methods for controlling blade tip clearance are often dependent on the aircraft velocity and flight path.

SUMMARY OF THE INVENTION

According to one embodiment of the present invention, a method of controlling a clearance between a first rotor disk and a second rotor disk of an aircraft includes: measuring an angle of deviation of at least the first rotor disk of the aircraft, wherein the angle of deviation is indicative of the clearance between the first rotor disk and the second rotor disk; determining a flight state of the aircraft; determining an allocation of control settings to axis-controlling devices of the aircraft to attain a pitch suitable to a desired flight path of the aircraft, wherein the allocation is based at least on the measured angle of deviation and the flight state of the aircraft; and implementing the control settings at the axis-controlling devices to control the clearance.

According to another embodiment of the present invention, a flight control system for an aircraft includes: a sensor for measuring an angle of deviation of at least one of a first rotor disk and a second rotor disk, wherein the angle of deviation is indicative of a clearance between the first rotor disk and the second rotor disk; a sensor for measuring a flight state of the aircraft; and a control allocation module that uses the flight state of the aircraft to determine an allocation of control settings to axis-controlling devices of the aircraft to attain a pitch suitable to a desired flight path of the aircraft, wherein the allocation is based at least on the measured angle of deviation and the flight state of the aircraft and a feedback that generates commands to control the clearance.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
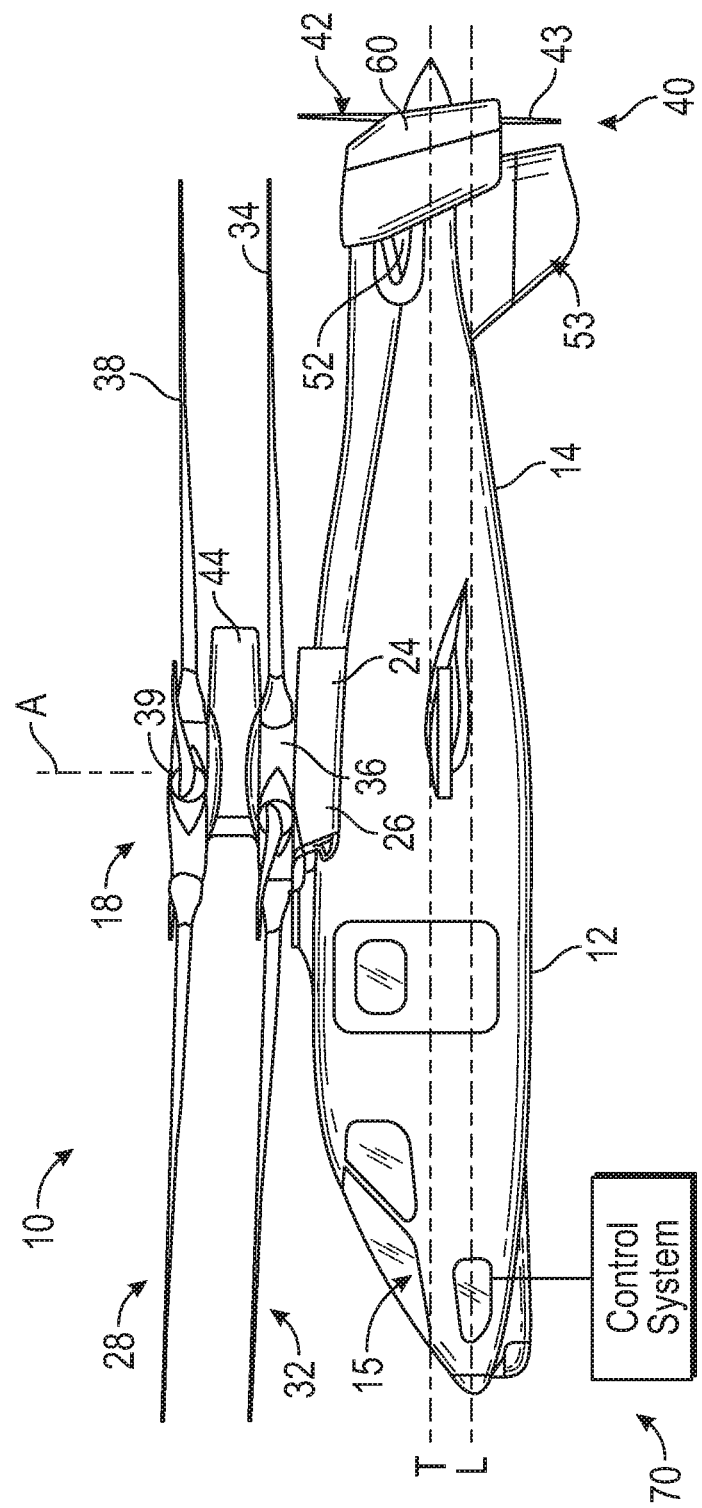
FIGS. 1 and 2 depict an exemplary embodiment of a rotary wing, vertical takeoff and land (VTOL) aircraft.
Figure 2:
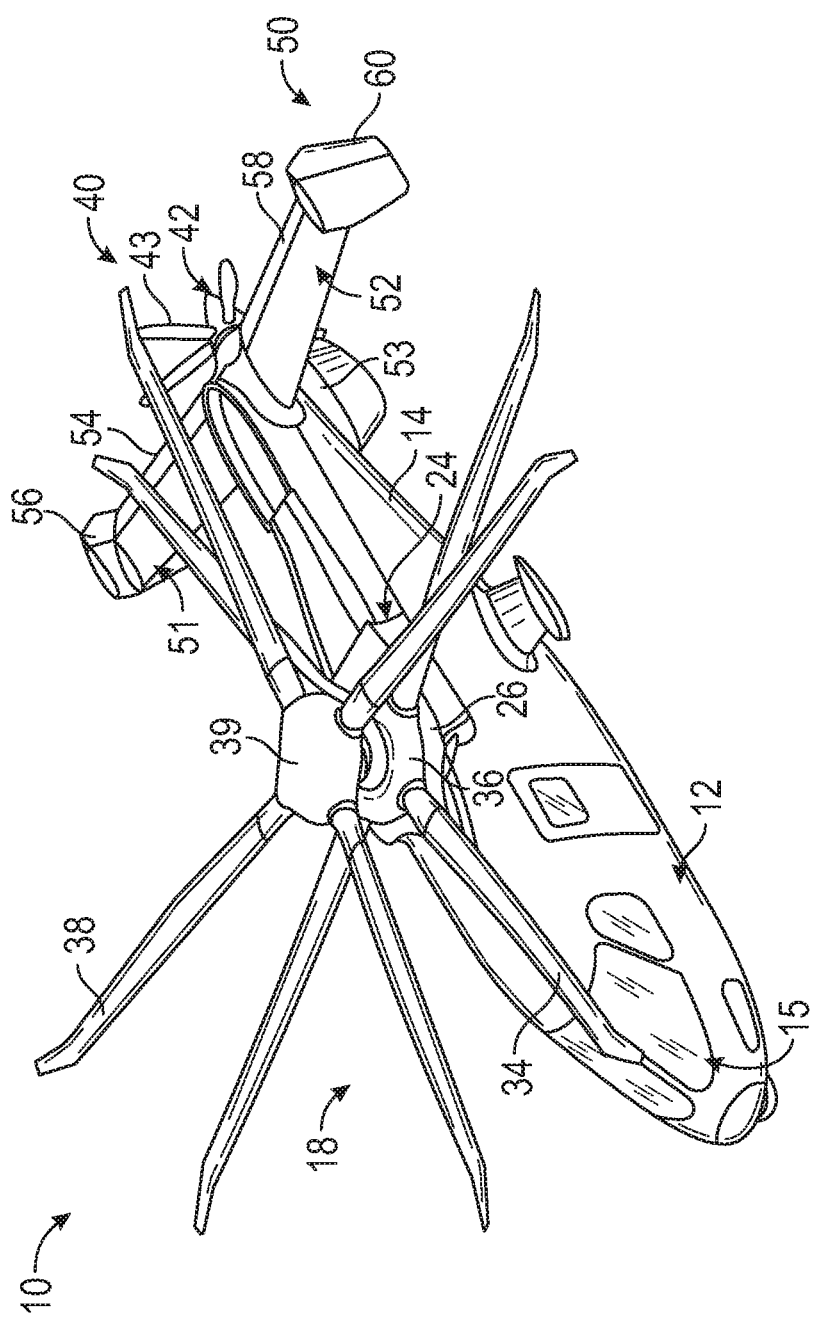

Referring now to the Figures, where the invention will be described with reference to specific embodiments, without limiting same, FIGS. 1 and 2 depict an exemplary embodiment of a rotary wing, vertical takeoff and land (VTOL) aircraft 10. The aircraft 10 includes an airframe 12 with an extending tail 14. A dual, counter rotating, coaxial main rotor assembly 18 is located at the airframe 12 and rotates about a main rotor axis, A. In an exemplary embodiment, the airframe 12 includes a cockpit 15 having two seats for flight crew (e.g., pilot and co-pilot) and six seats for passengers (not shown). Main rotor assembly 18 is driven by a power source, for example, one or more engines 24 via a gearbox 26. Main rotor assembly 18 includes an upper rotor assembly 28 driven in a first direction (e.g., counter-clockwise) about the main rotor axis, A, and a lower rotor assembly 32 driven in a second direction (e.g., clockwise) about the main rotor axis, A, opposite to the first direction (i.e., counter rotating rotors). Upper rotor assembly 28 includes a first plurality of rotor blades 34 supported by a first rotor hub 36. Lower rotor assembly 32 includes a second plurality of rotor blades 38 supported by a second rotor hub 39. The first plurality of rotor blades 34 rotate through a first rotor disk and the second plurality of rotor blades 38 rotate through a second rotor disk. In some embodiments, the aircraft 10 further includes a translational thrust system 40 having a propeller 42 located at the extending tail 14 to provide translational thrust (forward or rearward) for aircraft 10. Propeller 42 includes a plurality of blades 43.

Main rotor assembly 18 includes a rotor hub fairing 44 generally located between and around the upper and lower rotor assemblies 28 and 32 such that rotor hub 36 and rotor hub 39 are at least partially contained therein. Rotor hub fairing 44 provides drag reduction. First plurality of rotor blades 34 is connected to rotor hub 36 in a hingeless manner, also referred to as a rigid rotor system. Similarly, second plurality of rotor blades 38 is connected to rotor hub 39 in a hingeless manner. In accordance with an aspect of the exemplary embodiment, upper and lower rotor assemblies 28 and 32 rotate about a fixed axis. For a given rotor assembly, a differential longitudinal main rotor command is used to at least partially control a longitudinal tilt ($\varphi_x$) of the rotor assembly, and a differential lateral main rotor command is used to at least partially control a lateral tilt ($\varphi_y$) of the rotor assembly. Although a particular aircraft configuration is illustrated in this non-limiting embodiment, other rotary wing aircraft will also benefit from embodiments of the invention. Although, the dual rotor system is depicted as coaxial, embodiments include dual rotor aircraft having non-coaxial rotors.

Propeller 42, or translational thrust system 40, is connected to, and driven by, the engine 24 via the gearbox 26. Translational thrust system 40 may be mounted to the rear of the airframe 12 with a translational thrust axis, T, oriented substantially horizontal and parallel to the aircraft longitudinal axis, L, to provide thrust for high-speed flight. The term "parallel" should be understood to include a translational thrust axis that is coincident with the longitudinal axis. Translational thrust axis, T, corresponds to the axis of rotation of propeller 42. While shown in the context of a pusher-prop configuration, it is understood that the propeller 42 could also be a more conventional puller prop or could be variably facing so as to provide yaw control in addition to, or instead of, translational thrust. It should be understood that any such system or other translational thrust systems may alternatively or additionally be utilized. Alternative translational thrust systems may include different propulsion forms, such as a jet engine.

In accordance with an aspect of an exemplary embodiment, propeller blades 43 of translational thrust system 40 may include a variable pitch. More specifically, the pitch of propeller blades 43 may be altered to change the direction of thrust (e.g., forward or rearward). In accordance with another aspect of an exemplary embodiment, extended tail 14 includes a tail section 50 including starboard and port horizontal stabilizers 51 and 52. Tail section 50 also includes a vertical stabilizer 53 that extends downward from extending tail 14. Starboard horizontal stabilizer 51 includes a starboard active elevator 54 and a starboard active rudder 56. Similarly, port horizontal stabilizer 52 includes a port active elevator 58 and a port active rudder 60. Elevators 54 and 58 and rudders 56 and 60 act as controllable surfaces, e.g., surfaces that alter a flight path/characteristics of aircraft 10.

Depending on flight dynamics, the edges of the first rotor disk and the second rotor disk can approach each other to the point of coming in contact with one another. A clearance between the first rotor disk and the second rotor disk can indicate a distance between blade tips of the first rotor disk and blade tips of the second rotor disk. In one embodiment of the present invention, various control settings can be adjusted to widen, narrow, or otherwise control a clearance between first rotor disk and second rotor disk by changing differential lateral main rotor command and differential longitudinal main rotor command. Aircraft 10 includes a control system 70 for controlling flight of the aircraft 10. The control system 70 includes a processor (not shown) that executes a flight control system such as discussed below with respect to FIG. 3, in one embodiment. The flight control system 300 measures tip clearance and allocates control settings for flying the aircraft 10 suitable for controlling tip clearance between rotor disks.

Figure 3:
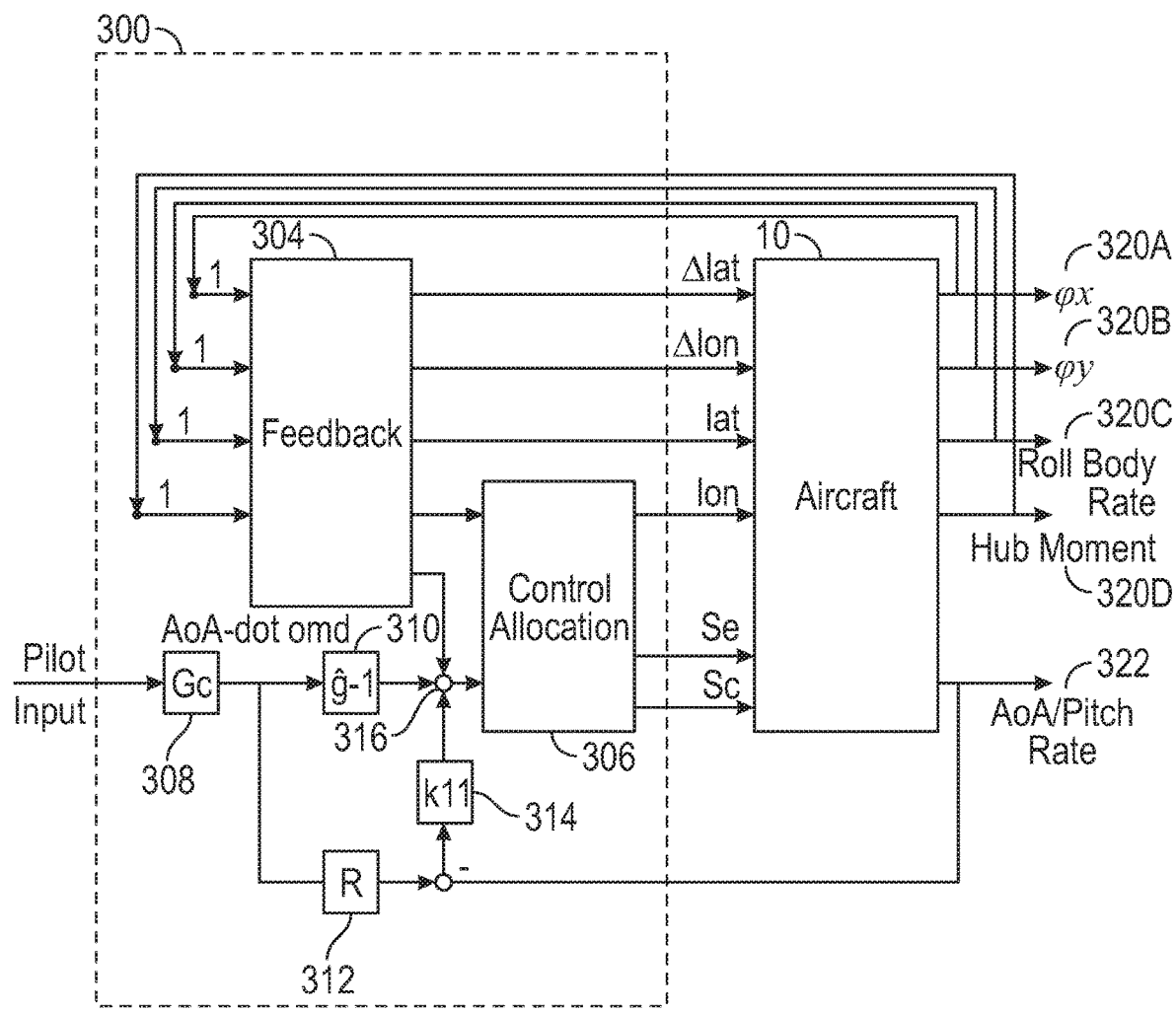
FIG. 3 shows a schematic diagram of a flight control system for flying the aircraft of FIGS. 1 and 2 that prevents contact between blades of the upper rotor disk and blades of the lower rotor disk.

FIG. 3 shows a schematic diagram of a model-following flight control system 300 for flying the aircraft 10 of FIGS. 1 and 2 so as to prevent contact between blades of the upper rotor disk and blades of the lower rotor disk. The flight control system 300 is connected to the aircraft 10, and includes a feedback module 304, a control allocation module 306, a command module 308, an inverse plant model 310, a reference model 312, and an AoA/pitch feedback module 314.

The aircraft 10 accepts commands to the control surfaces of the aircraft to thereby affect a state or operation of the aircraft 10. The aircraft 10 receives feedback signals from the feedback module 304 as well as control settings from the control allocation module 306 and controls the operation of the aircraft accordingly. Feedback signals from the feedback module 304 are also provided directly to the control allocation module 306 to allow the control allocation module 306 to determine an effective flight operation strategy. The control allocation module 306 allocates the control settings to the aircraft 10 that are based at least in part on feedback signals and a combination of feedback signals, pilot commands and angle of attack measurements. In one embodiment of the present invention, tip clearance is controlled by taking into account an amount of blade bending of the upper and lower rotor disks. The blade bending of the upper and lower rotor disks can be equated to two rotor disks that change orientation relative to each other. The rotor disks can change orientation laterally (y-direction, $\varphi_y$, 320b) and longitudinally (x-direction, $\varphi_x$, 320a). The $\varphi_x$ and $\varphi_y$ tilt angles therefore are indicative of blade tip clearance. Both tilt angles ($\varphi_x$ and $\varphi_y$) are measured and used in the feedback system (304) to generate lateral and longitudinal main rotor inputs to control the $\varphi_y$ and $\varphi_x$ tilt angles, respectively, in order to obtain a desired blade tip clearance.

Feedback signals provided to the aircraft 10 include signals for controlling lateral main rotor inputs (lat), differential longitudinal main rotor inputs (Δlon), and differential lateral main rotor inputs (Δlat). The control allocation module 306 provides signals to the aircraft 10 as control settings for longitudinal main rotor inputs (lon), elevator deflection commands (δe) and collective input commands (δc). The allocation of the control settings for longitudinal main rotor input commands (lon), elevator deflection commands (δe) and collective input commands (δc) is based on the flight condition of the aircraft. The aircraft 10 accepts flight control commands to various axis-controlling devices such as the main rotor and the elevators.

Sensors 320a-320d of the aircraft 10 measure various flight parameters suitable for determining a clearance between blade tips of the upper rotor disk and blade tips of the lower rotor disk. These flight parameters include, but are not limited to, deviation angles such as a longitudinal tilt ($\varphi_x$, 320a) and/or a lateral tilt ($\varphi_y$, 320b) of a rotor disk, the roll body rate 320c of the aircraft, and the hub moment 320d. Additional sensors can measure flight parameters such as angle of attack AoA and pitch body rate of the aircraft 10, aircraft speeds, etc.

The flight control system 300 further includes a pilot command module 308 that is accessible to the cyclic, collective and/or other flight control devices available to the pilot. The pilot command module 308 provides various pilot commands, including an AoA-dot command, to an inverse plant model 310. The AoA-dot command indicates a pilot's commanded change of AoA with respect to time. The AoA-dot command is also provided to a reference module 312 that provides a reference signal for an AoA/pitch rate feedback module 314. The reference signal is combined with an AoA/pitch rate feedback signal 322, which is indicative of current AoA and pitch rate, at the AoA/pitch rate feedback module 314. The AoA/pitch rate feedback module 314 provides a signal based on the AoA/pitch feedback signal 322 and a commanded AoA-dot command. The signal from the AoA/pitch rate feedback module 314 is used at the control allocation module 306. In particular, the signal from the AoA/pitch rate feedback module 314 combines with the command from the inverse plant model 310 and a feedback signal from the feedback module 304 at node 316. This combination is then provided to the control allocation module 306. The control allocation module 306 receives the combined signal as well as direct feedback signals from the feedback module 304 and performs calculations to determine an effective control strategy.

The coaxial rotorcraft configuration has multiple control inputs for controlling a given axis of the aircraft. In general, the collective main rotor ($\delta c$), longitudinal main rotor (lon) and elevator commands ($\delta e$) control the aircraft pitch axis. However, the effectiveness of each of the collective main rotor, longitudinal main rotor and elevator in controlling the pitch axis depends, in part, on the flight condition, i.e., forward speed, flight trajectory, etc. For example, elevators (54 and 58) become relatively ineffective in changing aircraft pitch axis when the aircraft is moving at slow speeds. To control the pitch of the aircraft effectively, the control allocation module 306 determines control settings that are effective for a given flight condition. The control allocation module 306 determines a degree by which to change each of the control settings (i.e., collective main rotor ($\delta c$), longitudinal main rotor (lon) and elevator commands ($\delta e$)) in order to control the aircraft pitch axis in a manner that is suitable to the current flight condition. Specifically, this control allocation module 306 determines an appropriate blend of the aircraft control settings from pilot commands (from inverse plant model 310), feedback commands (from feedback module 304) and the AoA/pitch rate feedback (from AoA/pitch rate feedback module 314).

When the aircraft is moving at a slow speed or hovering, it may be appropriate to command the aircraft pitch rate, i.e., have the actual aircraft pitch rate (322) track the commanded pitch rate, since the elevator setting has little or no effect on pitch rate at such slow speeds. Therefore at slow speeds, the control settings may rely on adjusting the longitudinal main rotor and the collective main rotor in order to affect pitch rate, rather than control the elevator setting.

However, at high speeds, it is advantageous to closely align the aircraft command with the actual aircraft flight path. Therefore, instead of a pitch rate command model, an AoA-dot command is employed at high speeds and the control allocation module 306 may allocate a suitable control setting. The control settings may implement the elevator settings alongside the longitudinal main rotor and collective main rotor settings, since the elevator can be used effectively at high speeds to affect aircraft pitch rate. The control allocation module 306 can also take into account aircraft altitude and aircraft weight (if known) in determining the control settings. While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A method of controlling a clearance between a first rotor disk and a second rotor disk of a main rotor of an aircraft, the method comprising:
    measuring an angle of deviation of at least one of the first rotor disk and the second rotor disk of the aircraft, wherein the angle of deviation is indicative of the clearance between the first rotor disk and the second rotor disk;
    determining a flight state of the aircraft;
    determining an allocation of control settings between the main rotor and an elevator of the aircraft to attain a selected pitch of the aircraft, wherein the allocation is based at least on the measured angles of deviation and the flight state of the aircraft; and
    implementing the control settings between the main rotor and the elevator to control the clearance.

2. The method of claim 1, wherein the first rotor disk and the second rotor disk are coaxially rotating rotor disks and the clearance is a distance between a blade tip of the first rotor disk and a blade tip of the second rotor disk.

3. The method of claim 1, wherein the control settings are related to an angle of attack (AoA) feedback signal that indicates the current angle of attack of the aircraft.

4. The method of claim 3, wherein the AoA feedback signal further includes a combination of the AoA feedback signal, a commanded pitch rate and a feedback signal from a feedback module of the aircraft.

5. The method of claim 1, wherein the control settings include at least one of: (i) a longitudinal setting for the main rotor of the aircraft; (ii) a lateral setting for the main motor of the aircraft; (iii) a setting for an angle of attack of the elevator; and (iv) a collective setting for the main rotor.

6. The method of claim 5, further comprising allocating the control settings based on at least one of: (i) a velocity of the aircraft; (ii) an altitude of the aircraft; and (iii) a weight of the aircraft.

7. The method of claim 1, wherein the angle of deviation is at least one of a longitudinal tip angle of the one of the first and second rotor disks and a lateral tilt angle of the first rotor disk.

8. The method of claim 1, wherein implementing the control settings further comprises at least one of: (i) implementing the aircraft pitch rate to track the commanded pitch rate when the aircraft is hovering; and (ii) implementing the aircraft pitch rate to align with the aircraft flight path.

9. A flight control system for an aircraft, comprising:
    a sensor for measuring an angle of deviation of at least one of a first rotor disk and a second rotor disk of a main rotor of the aircraft, wherein the angle of deviation is indicative of a clearance between the first rotor disk and the second rotor disk;
    a sensor for measuring a flight state of the aircraft; and
    a processor that uses the measured angle of deviation and the flight state of the aircraft to determine an allocation of control settings between the main rotor and an elevator of the aircraft to attain a selected pitch of the aircraft that controls the clearance, wherein the allocation is based at least on the measured angle of deviation and the flight state of the aircraft.

10. The flight system of claim 9, wherein the first rotor disk and the second rotor disk are coaxially rotating rotor disks and the clearance is a distance between a blade tip of the first rotor disk and a blade tip of the second rotor disk.

11. The flight system of claim 10, wherein the processor allocates the control settings based on an angle of attack (AoA) feedback signal that indicates the current angle of attack of the aircraft.

12. The flight system of claim 11, wherein the AoA feedback signal further includes a combination of the AoA feedback signal, a commanded pitch rate, and a feedback signal from a feedback module of the aircraft.

13. The flight system of claim 11, wherein the control settings include at least one of: (i) a longitudinal setting for the main rotor; (ii) a lateral setting for the main rotor of the aircraft; (iii) a setting for an angle of attack of the elevator; and (iv) a collective setting for the main rotor.

14. The flight system of claim 12, wherein the processor allocates the control settings based on at least one of: (i) a velocity of the aircraft; (ii) an altitude of the aircraft; and (iii) a weight of the aircraft.

15. The flight system of claim 12, wherein the angle of deviation is at least one of a longitudinal tip angle of the one of the first and second rotor disks and a latitudinal tilt angle of the first rotor disk.

\* \* \* \* \*